United States Patent
Sumnicht et al.

(10) Patent No.: US 10,696,837 B2
(45) Date of Patent: *Jun. 30, 2020

(54) POLYVINYL ALCOHOL FIBERS AND FILMS WITH MINERAL FILLERS AND SMALL CELLULOSE PARTICLES

(71) Applicant: GPCP IP Holdings LLC, Atlanta, GA (US)

(72) Inventors: Daniel W. Sumnicht, Hobart, WI (US); Thomas Schulze, Rudolstadt (DE); Frank-Gunther Niemz, Rudolstadt (DE)

(73) Assignee: GPCP IP Holdings LLC, Atlanta, GA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/637,436

(22) Filed: Jun. 29, 2017

(65) Prior Publication Data

US 2017/0298572 A1    Oct. 19, 2017

Related U.S. Application Data

(62) Division of application No. 14/677,026, filed on Apr. 2, 2015, now Pat. No. 9,777,143.

(Continued)

(51) Int. Cl.
*C08L 29/04* (2006.01)
*B29C 48/00* (2019.01)
(Continued)

(52) U.S. Cl.
CPC ............ *C08L 29/04* (2013.01); *B29C 48/022* (2019.02); *C08J 5/18* (2013.01); *C08K 3/013* (2018.01);
(Continued)

(58) Field of Classification Search
CPC .......... C08L 29/04; C08K 3/013; C08K 3/22; C08K 3/26; C08K 3/346; C08K 2201/003;
(Continued)

(56) References Cited

U.S. PATENT DOCUMENTS 2,179,181 A   11/1939  Graenacher et al.
2,467,392 A    4/1949  Kinberg
(Continued)

FOREIGN PATENT DOCUMENTS

CA    1097466 A1    3/1981
CA    1227974 A1   10/1987
(Continued)

OTHER PUBLICATIONS

Machine translation of JPH1060207, 1998, performed on Espacenet on May 24, 2016.*

(Continued)

*Primary Examiner* — Nicholas E Hill
(74) *Attorney, Agent, or Firm* — Laura L. Bozek

(57) ABSTRACT

The present invention is directed to an article of manufacture, which can be a fiber and or a film. In one aspect, the fiber or the film comprises a polyvinyl alcohol (PVOH) and an inorganic filler comprising particles having an average diameter of less than about 20 micrometers. The PVOH has a degree of hydrolysis of greater than about 95% and is present in a range between about 20 wt. % and about 99 wt. % based on the total fiber weight. Methods of making the fibers and films are also disclosed.

26 Claims, 1 Drawing Sheet

Related U.S. Application Data

(60) Provisional application No. 61/978,336, filed on Apr. 11, 2014.

(51) Int. Cl.

| | | |
|---|---|---|
| *C08J 5/18* | (2006.01) | |
| *D01F 1/10* | (2006.01) | |
| *D21H 17/36* | (2006.01) | |
| *D01F 6/14* | (2006.01) | |
| *D21H 13/16* | (2006.01) | |
| *D21H 21/52* | (2006.01) | |
| *D21H 17/00* | (2006.01) | |
| *C08K 3/013* | (2018.01) | |
| *C08K 3/22* | (2006.01) | |
| *C08K 3/26* | (2006.01) | |
| *C08K 3/34* | (2006.01) | |
| *C08K 3/36* | (2006.01) | |
| *D21H 17/67* | (2006.01) | |
| *D21H 21/18* | (2006.01) | |
| *C08K 3/30* | (2006.01) | |
| *B29K 1/00* | (2006.01) | |
| *B29K 509/00* | (2006.01) | |
| *B29L 31/00* | (2006.01) | |

(52) U.S. Cl.
CPC ............... *C08K 3/22* (2013.01); *C08K 3/26* (2013.01); *C08K 3/346* (2013.01); *C08K 3/36* (2013.01); *D01F 1/10* (2013.01); *D01F 6/14* (2013.01); *D21H 13/16* (2013.01); *D21H 17/36* (2013.01); *D21H 17/675* (2013.01); *D21H 17/74* (2013.01); *D21H 21/18* (2013.01); *D21H 21/52* (2013.01); *B29K 2001/00* (2013.01); *B29K 2509/00* (2013.01); *B29L 2031/731* (2013.01); *C08J 2329/04* (2013.01); *C08J 2401/02* (2013.01); *C08K 2003/2241* (2013.01); *C08K 2003/265* (2013.01); *C08K 2003/3045* (2013.01); *C08K 2201/003* (2013.01)

(58) Field of Classification Search
CPC ........ C08K 2201/004; C08K 2201/005; C08K 2201/006
See application file for complete search history.

(56) References Cited

U.S. PATENT DOCUMENTS

| | | |
|---|---|---|
| 2,999,788 A | 9/1961 | Morgan |
| 3,114,670 A | 12/1963 | Hiroshi et al. |
| 3,447,939 A | 6/1969 | Johnson |
| 3,997,489 A | 12/1976 | Coker |
| 4,110,494 A | 8/1978 | Schindler et al. |
| 4,157,275 A | 6/1979 | Hollander |
| 4,246,221 A | 1/1981 | McCorsley, III |
| 4,474,907 A | 10/1984 | Genba et al. |
| 4,495,245 A | 1/1985 | Zunker |
| 4,713,290 A | 12/1987 | Kwon et al. |
| 5,275,699 A | 1/1994 | Allan et al. |
| 5,332,474 A | 7/1994 | Maxham |
| 5,380,403 A | 1/1995 | Robeson et al. |
| 5,380,588 A | 1/1995 | Nishiyama et al. |
| 5,611,885 A | 3/1997 | Hansen et al. |
| 5,759,258 A | 6/1998 | Sohara et al. |
| 5,763,100 A | 6/1998 | Quick et al. |
| 5,772,937 A | 6/1998 | Cohen et al. |
| 5,795,377 A | 8/1998 | Tanner et al. |
| 5,846,378 A | 12/1998 | Phipps |
| 5,919,424 A | 7/1999 | Klyosov et al. |
| 5,928,741 A | 7/1999 | Andersen et al. |
| 5,928,784 A | 7/1999 | Sugihara et al. |
| 5,961,941 A | 10/1999 | Klyosov et al. |
| 6,020,425 A | 2/2000 | Wang et al. |
| 6,146,498 A | 11/2000 | Hsu et al. |
| 6,214,163 B1 | 4/2001 | Matsuda et al. |
| 6,214,166 B1 | 4/2001 | Münchow et al. |
| 6,260,511 B1 | 7/2001 | Hsu et al. |
| 6,413,591 B1 | 7/2002 | Dettling et al. |
| 6,451,884 B1 | 9/2002 | Cowen et al. |
| 6,608,121 B2* | 8/2003 | Isozaki ............... C08K 5/04 524/385 |
| 7,655,112 B2 | 2/2010 | Koslow |
| 8,157,958 B2 | 4/2012 | Duarte Villa et al. |
| 8,268,424 B1 | 9/2012 | Suzuki et al. |
| 8,372,320 B2 | 2/2013 | Gardner et al. |
| 8,747,612 B2 | 6/2014 | Heskanen et al. |
| 9,777,129 B2* | 10/2017 | Sumnicht ............ C08J 5/18 |
| 9,777,143 B2* | 10/2017 | Sumnicht ........... D21H 17/675 |
| 2002/0037946 A1 | 3/2002 | Isozaki et al. |
| 2003/0008966 A1* | 1/2003 | Vane ................. C08K 3/22 524/503 |
| 2004/0020616 A1 | 2/2004 | Dahlblom et al. |
| 2005/0118419 A1 | 6/2005 | Kwon et al. |
| 2005/0181206 A1 | 8/2005 | Endo et al. |
| 2006/0012072 A1 | 1/2006 | Hagewood et al. |
| 2008/0265222 A1 | 10/2008 | Ozersky et al. |
| 2009/0308551 A1 | 12/2009 | Kokko et al. |
| 2010/0009168 A1 | 1/2010 | Raukola et al. |
| 2010/0059191 A1 | 3/2010 | Garcia Melgarejo et al. |
| 2010/0065236 A1 | 3/2010 | Henriksson et al. |
| 2010/0291183 A1* | 11/2010 | Farrell ............... A61K 9/284 424/443 |
| 2011/0030907 A1 | 2/2011 | Nakamoto et al. |
| 2011/0192558 A1 | 8/2011 | Taylor et al. |
| 2011/0315333 A1 | 12/2011 | Vyorykka et al. |
| 2012/0055642 A1 | 3/2012 | Lahtinen |
| 2012/0107480 A1 | 5/2012 | Gane et al. |
| 2012/0214979 A1 | 8/2012 | Heiskanen et al. |
| 2012/0245257 A1 | 9/2012 | Fascio |
| 2013/0131193 A1 | 5/2013 | Gane et al. |
| 2014/0069302 A1 | 3/2014 | Saastamoinen et al. |
| 2015/0075406 A1 | 3/2015 | Nemoto et al. |
| 2015/0125658 A1 | 5/2015 | Bilodeau et al. |
| 2015/0291752 A1 | 10/2015 | Sumnicht et al. |
| 2015/0291786 A1 | 10/2015 | Sumnicht et al. |

FOREIGN PATENT DOCUMENTS

| | | |
|---|---|---|
| CA | 2313213 A1 | 1/2001 |
| CA | 2678313 A1 | 3/2010 |
| CA | 2676961 A1 | 2/2011 |
| CN | 102482850 A | 5/2012 |
| EP | 0097371 A1 | 1/1984 |
| EP | 0520297 A1 | 12/1992 |
| EP | 1180536 A1 | 2/2002 |
| EP | 1219744 A1 | 7/2002 |
| EP | 1448855 A1 | 8/2004 |
| EP | 1817455 A1 | 8/2007 |
| EP | 2292815 A1 | 3/2011 |
| EP | 2305749 A1 | 4/2011 |
| EP | 2386683 A1 | 11/2011 |
| EP | 2520709 A1 | 11/2012 |
| EP | 2520710 A1 | 11/2012 |
| GB | 2467392 A | 8/2010 |
| JP | S53-45424 A | 4/1978 |
| JP | 04182184 A | 6/1992 |
| JP | 1060207 A | 3/1998 |
| JP | H10-60207 * | 3/1998 |
| JP | 2001020135 A | 1/2001 |
| JP | 2006-322090 A | 11/2006 |
| JP | 2010242063 A | 10/2010 |
| RU | 2297956 C2 | 3/2005 |
| TW | 388776 B | 5/2000 |
| WO | 9426513 A1 | 11/1994 |
| WO | 0210279 A1 | 2/2002 |
| WO | 2010132204 A1 | 11/2010 |
| WO | 2011051882 A1 | 5/2011 |
| WO | 2011078770 A1 | 6/2011 |

(56) References Cited

FOREIGN PATENT DOCUMENTS

| WO | 2013098480 A1 | 7/2013 |
|---|---|---|
| WO | 2013188739 A1 | 12/2013 |

OTHER PUBLICATIONS

Auer, G, et al., "Pigments, Inorganic, 2. White Pigments," Ullmann's Encyclopedia of Industrial Chemistry, published online 2009, vol. 27, pp. 257-291.*

Titanium Dioxide, Wikipedia entry, downloaded on Jun. 5, 2019 (15 pages).*

Manfred L. Hallensleben, "Polyvinyl Compounds, Others," in 29 Ullmann's Encyclopedia of Industrial Chemistry 605 (published online 2000).*

Altemeier, M., et al.; "Size Press Filling Boosts Ash Content, Enhances Uncoated Free-Sheet Quality"; Pulp & Paper; p. 52-54; Jan. 2004.

Auer, G., et al., "Pigments, Inorganic, 2. White Pigments," Ullmann's Encyclopedia of Industrial Chemistry, published online 2009, 36 pages.

Baheti, Vijay, et al.; "Reinforcement of Wet Milled jute Nano/Micro Particles in Polyvinyl Alcohol Films"; Fibers and Polymers; vol. 14, No. 14; p. 133-137; 2013.

Baxter, George; "Carbonless Copying Papers"; Environmental Aspects of Chemical Use in Printing Operations; Office of Toxic Substances Environmental Protection Agency; p. 426-446; 1976.

Bezerra, E.M.; "The Effect of Different Mineral Additions and Synthetic Fiber Contents on Properties of Cement Based Composite"; Cement & Concrete Composites; vol. 28; p. 555-563; 2006.

Chiellini, Emo, et al.; "Composite Films Based on Biorelated Agro-Industrial Waste and Poly(vinyl alcohol). Preparation and Mechanical Properties Characterization"; Biomacromolecules; vol. 2; p. 1029-1037; 2001.

El-Shinawy, Nabila A., et al.; "Internal Treatment of Paper Sheets From Wood and Bagasse Pulps with Polyvinyl Alcohol"; Polym.-Plast. Technol. Eng.; vol. 37, No. 2; p. 141-173; 1998.

International Search Report and Written Opinion dated Mar. 7, 2015 for Application No. PCT/US2015/024507; 9 pages.

International Search Report and Written Opinion dated Nov. 6, 2015 for PCT Application No. PCT/US2015/024512; 10 pages.

Kane, T.G.; "Polyvinyl Alcohol/Starch Sized Can Reduce Pulp Cost for Fine Paper"; Pulp & Paper; p. 125-128; Feb. 1978.

Lvov, Yuri M., et al.; "Nano- Micro- Macro Integration for New Cellulose Based Materials";62nd Southwest Regional Meeting of American Chemical Society; 1 page; Oct. 19-22, 2006.

Wendler, Frank, et al.; "Cellulose Products from Solutions: Film, Fibres and Aarogels"; The European Polysaccharide Network of Excellence (EPNOE); p. 153-185; 2012.

Perng, Yuan-Shing, et al.; "Optimization of Handsheet Greaseproof Properties: The Effects of Furnish, Refining, Fillers, and Binders"; Perng and Wang; vol. 7, No. 3; p. 3895-3909; 2012.

Ridgway, Cathy J., et al.; "Size-Selective Absorption and Adsorption in Anionic Pigmented Porous Coating Structures: Case Study Cationic Starch Polymer Versus Nanofibrillated Cellulose"; Cellulose; vol. 20; p. 933-951; 2013.

Serizawa, Takeshi, et al.; "Cell-Compatible Properties of Calcium Carbonates and Hydroxyapatite Deposited on Ultrathin Poly(vinyl alcohol)-Coated Polyethylene Films"; J. Biomater. Sci. Polymer Edn.; vol. 14, No. 7; p. 653-663; 2003.

Trufakina, L.M.; "Utilization of Polymeric Composites with Fillers Made of Reproducible Natural Raw Material"; Russian Journal of Applied Chemistry; vol. 84, No. 11; p. 1936-1939; 2011.

* cited by examiner

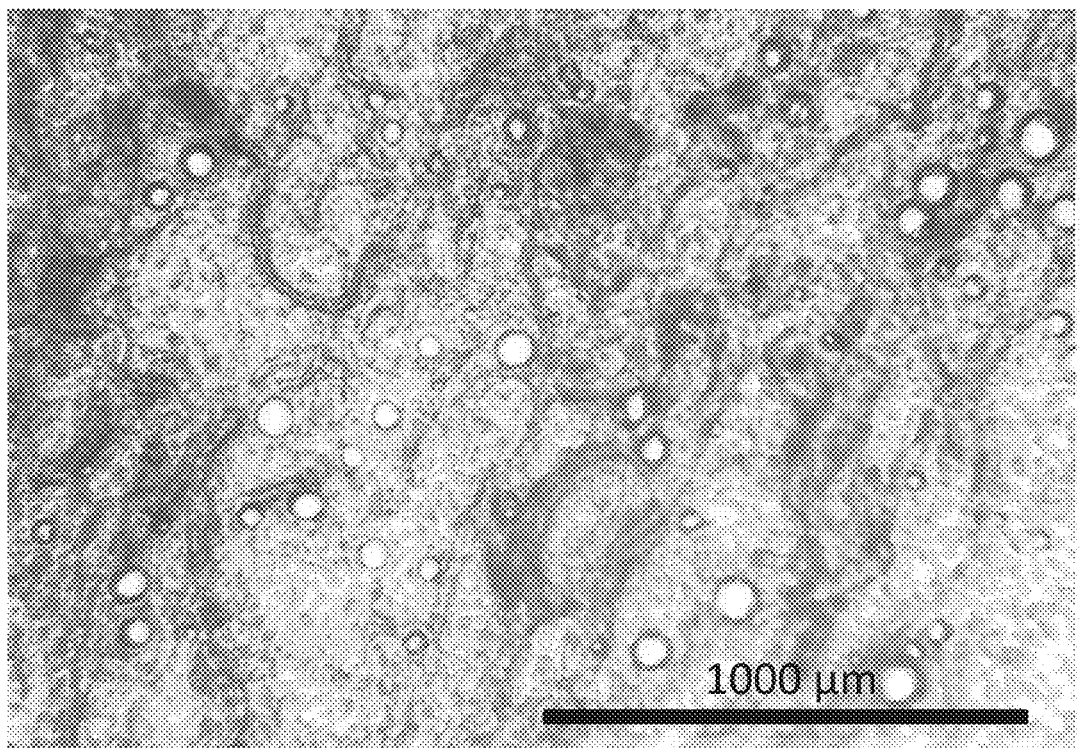

POLYVINYL ALCOHOL FIBERS AND FILMS WITH MINERAL FILLERS AND SMALL CELLULOSE PARTICLES

CROSS-REFERENCE TO RELATED APPLICATIONS

This application is a divisional and claims priority to U.S. Nonprovisional patent application Ser. No. 14/677,026, filed on Apr. 2, 2015, which claims priority to U.S. Provisional Patent Application No. 61/978,336, filed Apr. 11, 2014, both applications are incorporated herein in their entirety.

TECHNICAL FIELD

The present invention is directed generally to polyvinyl alcohol (PVOH) fibers and films. More specifically, the invention is related PVOH fibers and films comprising fillers.

BACKGROUND OF THE INVENTION

Polyvinyl alcohol (PVOH) binder fibers are useful for increasing the strength of paper products, although fiber cost can be prohibitive for many applications. Fiber cost can be mitigated by introducing fillers that are cheaper than PVOH. However, alternative fibers that incorporate recycled materials as fillers may not be suitable for white paper products because fibers produced are dark in color.

Bright fillers, such as precipitated calcium carbonate or other minerals, are commonly compounded with plastics, such as polypropylene. Polymers compounded with fillers may require low moisture content, depending on the polymer/filler combination. For example, fine, bright cellulose particles generally need to be dry to be compatible with plastic. PVOH is less restrictive on moisture content than plastics. Fillers in water may be combined with PVOH and formed into fibers and films without drying beforehand. When PVOH is the polymer, fine cellulose particles generally do not need to be pre-dried before mixing and forming fibers and films.

Based on the foregoing, there exists a need for cost-effective, water-based, filled PVOH fibers that can be incorporated into white paper products. Accordingly, it is to solving this and other needs the present invention is directed.

SUMMARY OF THE INVENTION

The present invention is directed to articles of manufacture. In one aspect, the article is a fiber or a film. In another aspect, the article includes a PVOH and an inorganic filler comprising particles having an average diameter of less than about 20 micrometers. The PVOH has a degree of hydrolysis of greater than about 95% and is present in a range between about 20 wt. % and about 99 wt. % based on the total article weight.

Yet, in another aspect, the article includes a PVOH and an inorganic filler comprising particles having an average diameter of less than about 20 micrometers. The PVOH has a degree of hydrolysis of greater than about 95%, is partially soluble in water at a temperature of less than about 95° C., and is present in a range between about 20 wt. % and about 99 wt. % based on the total fiber weight.

Still yet, in another aspect, a method of making the article mixing a PVOH with a filler comprising particles having an average diameter of less than about 20 micrometers and preparing an extrudable spin mass. The PVOH has a degree of hydrolysis of greater than about 95% and is present in a range between about 20 wt. % and about 99 wt. % based on the total fiber weight.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

Other advantages and capabilities of the invention will become apparent from the following description taken in conjunction with the examples showing aspects of the present invention.

BRIEF DESCRIPTION OF THE DRAWINGS

The invention will be better understood and the above object as well as objects other than those set forth above will become apparent when consideration is given to the following detailed description thereof. Such description makes reference to the annexed drawings wherein:

The sole FIGURE is a photomicrograph of a polyvinyl alcohol film made in accordance with the present invention.

DETAILED DESCRIPTION OF THE INVENTION

For a fuller understanding of the nature and desired objects of this invention, reference should be made to the above and following detailed description taken in connection with the accompanying figure.

Terminology used herein is given its ordinary meaning consistent with the exemplary definitions set forth immediately below; mg refers to milligrams and m² refers to square meters, and so forth. Unless otherwise specified, % means weight percent.

The terms "article of manufacture" or "article" as used herein means fibers, films, and other shaped objects. The articles of manufacture include a binder and a filler. The binder is a polyvinyl alcohol (PVOH), cellulose nanofibrils, or a combination of the PVOH and cellulose nanofibrils. The filler is any combination of high brightness mineral fillers and cellulose fines.

The term "fiber" as used herein means an article in which the length to diameter ratio is greater than about 10. Alternatively, a fiber can have an average diameter in a range between about 10 and about 300 micrometers.

The term "film" as used herein means an article which is a thin, flexible strip. A film can have an average thicknesses in a range between about 10 and about 200 micrometers.

The term "inorganic filler" and "filler" as used herein means any particles, salts, or minerals having an average diameter of less than about 20 micrometers.

The term "degree of polymerization" (DP) as used herein means the number of monomeric units in a polymer. For a homopolymer, such as PVOH, there is only one type of monomeric unit; thus, the number-average DP is given by $M_n/M_0$. $M_n$ is the average molecular weight of the polymer, and $M_0$ is the molecular weight of the monomer unit.

The term "degree of hydrolysis" as used herein means the proportion of acetate groups in polyvinyl acetate that have been converted to alcohol groups to form the polyvinyl alcohol. The PVOH used in the present invention has a degree of hydrolysis of at least about 95%, which is the minimum threshold required to maintain water-solubility.

The term "substantially soluble in water" as used herein means substantially dissolving in water at the provided temperature. Initially, the PVOH used is substantially soluble. The term "partially soluble in water" as used herein means partially dissolving in water at the provided temperature. During processing and in the final article of manufacture, the PVOH is partially soluble in water.

The terms "wood pulp" and "pulp" as used herein refer to a cellulosic material obtained from wood produced according to a chemical pulping process including, but not limited to, sulfite pulping, kraft pulping, polysulfide pulping, and soda pulping processes. Non-limiting examples of wood pulps include hardwood kraft pulp, softwood kraft pulp, hardwood sulfite pulp, softwood sulfite pulp, or any combination thereof. The cellulose fibers of the present invention can be derived from any type of wood pulp. The pulp can be bleached by chemical means, for example by chlorine dioxide, oxygen, alkaline peroxide and so forth.

The term "papermaking fibers" as used herein includes virgin pulp derived fibers, recycled (secondary) cellulosic fibers, and fiber mixes comprising cellulosic fibers. Suitable papermaking fibers include, but are not limited to: nonwood fibers, such as cotton fibers or cotton derivative fibers, abaca fibers, kenaf fibers, sabai grass fibers, bamboo, flax fibers, esparto grass fibers, straw fibers, jute hemp fibers, bagasse fibers, milkweed floss fibers, and pineapple leaf fibers; and wood fibers, such as those obtained from deciduous and coniferous trees, including softwood fibers, such as northern and southern softwood Kraft fibers; hardwood fibers, such as eucalyptus fibers, maple fibers, birch fibers, aspen fibers, and the like.

Kraft softwood fiber is low yield fiber made by the Kraft (sulfate) pulping process from coniferous material and includes northern and southern softwood Kraft fiber, Douglas fir Kraft fiber and so forth. Kraft hardwood fiber is made by the Kraft process from hardwood sources, e.g., eucalyptus. Naturally occurring pulp-derived fibers are referred to herein simply as "pulp-derived" papermaking fibers. The fibers, films, papers, and products of the present invention can include blends of conventional fibers (derived from virgin pulp or recycled sources).

The term "tissue furnish" as used herein refer to aqueous compositions comprising fibers of this invention, cellulose fibers, papermaking fibers, or any combination thereof. Optionally, tissue furnishes include wet strength resins, debonders, other additives, and the like for making paper products. The term "tissue furnish" is used interchangeably with "fiber slurry."

The term "waste paper" as used herein refers to paper or cardboard which, after use, is recovered in the form of recycled fiber and then re-used to produce paper, cardboard, or paper products for some other industrial purpose. "Recycled" fiber thus refers to fiber material that has previously been used in a paper or cardboard product.

The term "cellulose particle" as used herein means cellulose nanofibrils or cellulose fines. Cellulose fines are small cellulose particles commonly found in wood pulp. Cellulose fines can have dimensions in a range between about 1 and about 200 micrometers.

The term "cellulose nanofibrils" as used herein means "nanofibrillated cellulose" (NFC), "microfibrillated cellulose" (MFC), cellulose fibrids, fibrillated lyocell, or any combination thereof. As used herein, the terms NFC and MFC are used interchangeably. Cellulose nanofibrils are derived from plant cell walls, which comprise microfibrils or nanofibrils composed of small bundles of cellulose chains. The microfibrils or nanofibrils can be isolated, which is described below, as collections or bundles of individual, isolated cellulose microfibrils or nanofibrils. Cellulose nanofibrils can comprise hardwood kraft pulp, softwood kraft pulp, hardwood sulfite pulp, softwood sulfite pulp, or any combination thereof. MFC and NFC can have average lengths in a range between about 300 nanometers (nm) to about 4,500 nm. In addition, MFC and NFC can have average diameters in a range between about 3 nm to about 100 nm. The aspect ratio is about 100 to about 150. An important property of NFC, enabling it to function as a binder, is its ability to bond to tightly to itself upon drying that it does not re-disperse into individual nanofibrils upon rewetting.

The term "cellulose fibrid" as used herein means fine cellulose fibers produced by regenerating cellulose (described in detail below). Cellulose fibrids can have average lengths in a range between about 300 nm to about 4,500 nm. In addition, cellulose fibrids can have average diameters in a range between about 3 nm to about 100 nm. The aspect ratio is about 100 to 150.

The term "fibrillated lyocell" as used herein means a cellulose fiber obtained first by an organic solvent spinning process followed mechanical treatment that results in cellulose nanofibrils. The organic solvent comprises a mixture of organic chemicals and water, and the solvent spinning process involves dissolving cellulose in the organic solvent to form a solution which is pumped through spinnerets to produce fibers without formation of a derivative of the cellulose.

The terms "extrudable dope" and "extrudable spin mass" as used herein are used interchangeably and means a composition including a binder, a filler, and optionally, a processing aid, that can be extruded through an orifice, such as a spinneret to form shaped articles of manufacture, for example fibers and films. The binder is a polyvinyl alcohol (PVOH), cellulose nanofibrils, or a combination of the PVOH and cellulose nanofibrils, and the filler is any combination of high brightness mineral and cellulose fines.

In the context of producing a cost-effective fiber or tissue product, the use of synthetic fibers or materials, such as PVOH, is a viable option. PVOH is useful in papermaking applications because it can be substantially soluble in water (before forming an article of manufacture), provides a substantial bonding effect, improves paper strength, and is resistant to alkaline conditions. The solubility and bonding of the article may be changed during or after forming the article through various techniques if desired.

The present invention combines a PVOH with an inorganic filler to form articles of manufacture and other shaped objects, for example fibers and films. In another aspect, inorganic filler can be incorporated into a PVOH, formed into a dried film, and ground to a particle size that can be retained in a paper web. Paper webs and paper products include, but are not limited to, tissues, bath tissue, napkins, paper towels, facial tissues, filter paper, handsheets, and the like.

The PVOH and inorganic filler combination described herein provides for articles of manufacture with optional levels of solubility, including fibers and films. Thus, these articles can be incorporated into a variety of flushable and disposable products. Furthermore, the use of virgin inorganic fillers, as described herein, provides brightened and whiter fibers and films.

Yet in another aspect of the present invention, a fiber includes a PVOH and an inorganic filler comprising particles having an average diameter of less than about 20 micrometers. The PVOH has a degree of hydrolysis of greater than about 95% and is present in a range between about 20 wt. % and about 99 wt. % based on the total fiber weight. The PVOH can be impregnated with the filler, or the PVOH can encapsulate the filler.

The average diameter of the fibers of the present invention can be any diameter, depending on the application. In one aspect, the fibers have an average diameter of less than about 300 micrometers. In another aspect, the fibers have an average diameter in a range between about 100 micrometers and about 250 micrometers. Yet, in another, aspect, the fibers have an average diameter in a range between about 50 micrometers and about 100 micrometers. Yet, in another, aspect, the fibers have an average diameter in a range between about 10 micrometers and about 50 micrometers. Still, in another aspect, the fibers have an average diameter about or in the range between about 10, 20, 30, 40, 50, 60, 70, 80, 90, 100, 110, 120, 130, 140, 150, 160, 170, 180, 190, 200, 210, 220, 230, 240, 250, 260, 270, 280, 290, and 300 micrometers.

PVOH

PVOH such as MOWIOL® 10/98, which is commercially available from Kuraray America Inc., Houston, Tex., is one example of a suitable input material. In one aspect, the PVOH used in the present invention is substantially soluble in water at a temperature of less than about 100° C. In another aspect, the PVOH is substantially soluble in water at a temperature of less than about 98° C. or about 95° C. Yet, in another aspect, the PVOH is substantially soluble in water at a temperature in a range between about 75° C. and about 95° C. Still yet, in another aspect, the PVOH is substantially soluble in water at a temperature of less than about 85° C. In one aspect, the PVOH is substantially soluble in water at a temperature about or in any range between about 50° C., 52° C., 55° C., 57° C., 60° C., 62° C., 65° C., 67° C., 70° C., 72° C., 75° C., 77° C., 80° C., 82° C., 85° C., 87° C., 90° C., 92° C., 95° C., 97° C., and 99° C.

However, although the PVOH is initially substantially soluble in water at the provided temperature, the PVOH becomes either partially soluble in water or substantially insoluble in water during processing and formation of the final article of manufacture. Thus, in the article of manufacture, the PVOH is partially soluble in water at a temperature of less than about 98° C. or about 95° C. Yet, in another aspect, the PVOH is partially soluble in water at a temperature in a range between about 75° C. and about 95° C. Still yet, in another aspect, the PVOH is partially soluble in water at a temperature of less than about 85° C. In one aspect, the PVOH is partially soluble in water at a temperature about or in any range between about 50° C., 52° C., 55° C., 57° C., 60° C., 62° C., 65° C., 67° C., 70° C., 72° C., 75° C., 77° C., 80° C., 82° C., 85° C., 87° C., 90° C., 92° C., 95° C., 97° C., and 99° C.

The PVOH can have an average degree of polymerization in a range between about 500 and about 3,000. In one aspect, the PVOH has an average degree of polymerization in a range between about 1,000 and about 1,600. Yet, in another aspect, the PVOH has an average degree of polymerization of about 1,400. Still, in another aspect, the PVOH has an average degree of polymerization about or in a range between about 500, 750, 1000, 1250, 1350, 1400, 1500, 1600, 1700, 2000, 2500, and 3000.

The degree of hydrolysis of the PVOH is important for water solubility and for mixing with fillers in water. The PVOH can have an average degree of hydrolysis of greater than about 95%. In another aspect, PVOH has an average degree of hydrolysis of greater than about 98%. Yet, in another aspect, the PVOH has an average degree of hydrolysis in a range between about 95% to about 99%. Still, in another aspect, the PVOH has an average degree of hydrolysis about or in a range between about 95%, 96%, 97%, 98%, 99%, or 100%.

The PVOH can be present in the article in a range between about 20 wt. % and about 80 wt. % based on the total weight of the article, which can be a fiber or a film. In one aspect, the PVOH is present in a range between about 20 wt. % and about 99 wt. %. Yet, in another aspect, the PVOH is present in a range between about 40 wt. % and about 60 wt. %. Still yet, in another aspect, the PVOH is present in a range between about 20 wt. % and about 99 wt. %. In another aspect, the PVOH is present in an amount about or in any range between about 20, 25, 30, 35, 40, 45, 50, 55, 60, 65, 70, 75, 80, 85, 90, 95, and 99 wt. %.

In one aspect, the PVOH and inorganic filler is combined to form fibers. In another aspect, the PVOH and inorganic filler is combined to form fibrids. PVOH fibrids can be produced by mixing PVOH with the inorganic filler to form a spin mass and then treating the spin mass with a shear field in a coagulation bath, such as saturated sodium sulfate solution, to form the PVOH fibrids. For example, the method disclosed in Canadian Patent No. CA 2,313,213 for cellulose fibrids can be used to produce filled PVOH fibrids. Filled PVOH fibrids can have an average length of about 200 to about 2500 microns. In another aspect, filled PVOH fibrids can have an average length of about 600 to about 2000 microns. In yet another aspect, filled PVOH fibrids can have an average length of about 800 to about 1500 microns.

Optionally, the sodium sulfate coagulation bath can be acidified with sulfuric (or any other) acid. Acidification induces the calcium carbonate inside the nascent fibrids to react with the acid and to generate $CO_2$ and expand the fibrids. The result provides for bulkier paper webs. Optional acids include hydrochloric acid, nitric acid, phosphoric acid, or any combination thereof. Optionally, sodium bicarbonate can be added to generate more $CO_2$ and further increase fiber bulk.

Filler

The inorganic filler used in the present invention can be any inorganic particle, material, mineral, or combination thereof, having an average diameter of less than about 20 micrometers. In one aspect, the inorganic filler comprises particles having an average diameter of about 1 micrometer to about 18 micrometers. In another aspect, the inorganic filler comprises particles having an average diameter of about 5 micrometers to about 10 micrometers. Yet, in another aspect, the inorganic filler comprises particles having an average diameter of about 2.5 micrometers to about 8 micrometers. Still yet, in another aspect, the inorganic filler comprises particles having an average diameter of about or in any range between about 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 micrometers.

Non-limiting examples of suitable inorganic fillers include, but are not limited to, precipitated calcium carbonate, ground calcium carbonate, gypsum, titanium dioxide, clay, silica, magnesium aluminum silicate, hydrated aluminum silicate, barium silicate, calcium silicate, magnesium silicate, strontium silicate, talc, mica, kaolin clay, sericite, muscovite, lepidolite, biotite, vermiculite, zeolite, barium sulfate, calcined calcium sulfate, hydroxyapatite, ceramic powder, colloidal silicone dioxide, boron nitride, or any combination thereof.

The inorganic filler can be present in the article in a range between about 1 wt. % and about 80 wt. % based on the total weight of the article. In one aspect, the article is a fiber or a film. In another aspect, the inorganic filler is present in a range between about 5 wt. % and about 50 wt. % based on the total weight of the article. Yet, in another aspect, the inorganic filler is present in a range between about 20 wt. % and about 60 wt. % based on the total weight of the article. Still yet, in another aspect, the inorganic filler is present in a range between about 30 wt. % and about 50 wt. % based on the total weight of the article. Still, in another aspect, the inorganic filler is present in an amount about or in a range between about 1, 2.5, 5, 7.5, 10, 12.5, 15, 17.5, 20, 25, 30, 35, 40, 42.4, 45, 47.5, and 50 wt. % based on the total weight of the article.

Cellulose fines can be incorporated into the articles of the present invention. In one aspect, the cellulose fines can have an average diameter in a range between about 1 micrometer and about 40 micrometers. Yet, in another aspect, the cellulose fines have an average dimensions about or in a range between about 1, 10, 20, 30, 40, 50, 60, 70, 80, 90, 100, 110, 120, 130, 140, 150, 160, 170, 180, 190, and 200 micrometers.

The physical properties of the PVOH of the present invention enable formation of a solid article of manufacture, including a fiber and a film, with limited solubility upon drying and after treatment. In addition, these PVOH in combination with the inorganic filler can dry into fibers, films, or other shaped objects. Further, the PVOH can trap, encapsulate, and bind small particles in the inorganic filler as the spin mass is extruded to form the objects. The fibers and films remain substantially in their shaped state when immersed in water or an aqueous environment. The objects can then be readily formed, retained, and bonded into a paper web.

As indicated above, a film of the present invention includes a PVOH and inorganic filler. The sole FIGURE illustrates a photomicrograph of a PVOH film. The PVOH film includes 55% PVOH, 33% PCC, and 11% cellulose fibers obtained from hardwood kraft pulp.

When used to produce a film, the PVOH can be impregnated with the inorganic filler, or the PVOH can encapsulate the inorganic filler. The films can have any average thickness, which depends on the application. In one aspect, the films have an average thickness in a range between about 10 micrometers to about 200 micrometers. In another aspect, the films have an average thickness in a range between about 50 micrometers to about 150 micrometers. Yet in another aspect, the films have an average thickness in a range between about 40 micrometers to about 100 micrometers.

In addition to fibers and films, papers can include PVOH and inorganic fillers. In another aspect of the present invention, a paper comprises a cellulosic substrate having a surface and a mixture being substantially disposed onto the surface or impregnating the cellulosic substrate. The mixture comprises a PVOH and an inorganic filler. The PVOH fibers formed can be incorporated into any paper or paper product.

Cellulose

In one aspect, the articles described herein can further include any pulp, cellulose particles, cellulose fibers, papermaking fibers, or any combination thereof. The cellulose particles can be cellulose nanofibrils or cellulose fines. Cellulose particles include, but are not limited to, hardwood kraft pulp particles, softwood kraft pulp particles, hardwood sulfite pulp particles, softwood sulfite pulp particles, grass pulp particles, or any combination thereof.

Cellulose nanofibrils, including NFC, can be combined or mixed with the inorganic filler and any suitable additives or processing aids to form a spin mass. NFC can be isolated by mechanical disintegration of the plant cell wall in wood pulp. In addition to mechanical force, various chemical pre-treatments, such as strong hydrolysis, can be used. Mechanical disintegration of NFC from cellulose raw material, cellulose pulp, wood pulp, or refined pulp is carried out with any suitable equipment, such as a refiner, a grinder, a homogenizer, a colloider, a friction grinder, an ultrasound sonicator, a fluidizer, such as a microfluidizer, a macrofluidizer or a fluidizer-type homogenizer. U.S. Patent Pub. No. 2012/0214979 A1 to Heiskanen et al. (now U.S. Pat. No. 7,747,612), which is incorporated herein in its entirety by reference, discloses an exemplary method for isolating NFC.

NFC also can be chemically or physically modified to form a derivative of cellulose or microfibril bundles. The chemical modification can be based, for example, on carboxymethylation, oxidation, esterification, or etherification reactions of cellulose molecules. Modification also is accomplished by physical adsorption of anionic, cationic, non-ionic substances, or any combination of thereof, onto the cellulose surface. The described modifications can be carried out before, after, or during the production of NFC.

Any of the above described methods for producing cellulose nanofibrils can be used in the present invention. In addition, any other suitable method known in the art can be used to produce the cellulose nanofibrils.

Cellulose fibrids can be produced by regenerating cellulose, for example, by initially dissolving cellulose or a cellulose derivative in a solvent to produce a cellulose spin mass. Following dissolution in a suitable solvent, mixing in a high-shear mixer can produce finely dispersed cellulose fibrids. These fibrids, like NFC, are fine enough that they form films, and other structures, that do not re-disperse upon wetting in water. Cellulose fibrids can be combined and mixed with inorganic fillers and any suitable additives or processing aids to form a spin mass. Subsequently, the spin mass can be extruded through spinnerets to form the fibers and films.

Exemplary methods of forming cellulose fibrids are disclosed in U.S. Pat. No. 2,999,788 to Morgan and U.S. Pat. No. 6,451,884 to Cowen et al., both of which are incorporated herein in their entirety by reference. As disclosed in U.S. Pat. No. 2,999,788, cellulosic fibrids can be made by mixing a spinning solution of cellulose and coagulating liquor together under turbulent conditions. One example of such a spinning solution is viscose, which contains sodium cellulose xanthate. Examples of coagulating liquors for viscose include, but are not limited to, aqueous salt solutions and aqueous acid solutions.

Canadian Patent No. CA 2,313,213, which is incorporated herein in its entirety by reference, describes an exemplary method of fibrid production using shear coagulation of a cellulose spin mass made with N-methylmorpholine N-oxide (NMMO or NMMNO). Briefly, a method of producing reactive fiber-like cellulose coagulates comprises steps of providing a solution of cellulose in a mixture containing water and NMMO, and then treating the solution in a precipitation bath containing water and NMMO with a shear field. The method has the advantage that no stretching or drawing in air in another non-precipitating medium is required for orienting the cellulose molecules along the fiber axis. Instead, the coagulates can directly be obtained in a precipitation path using a shear field generator. The shear field can be produced by surfaces that are closely arranged side by side and are movable relative to one another.

A method for dissolving cellulose to produce a cellulose spin mass is disclosed in U.S. Pat. No. 4,246,221 to McCorsley, which is incorporated herein in its entirety by reference. In addition, cellulose can be dissolved in a solution of a tertiary amine N-oxide to produce a spin mass. One process for dissolving cellulose in a tertiary amine N-oxide is disclosed, for example, U.S. Pat. No. 2,179,181 to Graenacher et al., which is incorporated herein in its entirety by reference. In accordance with the disclosure, oxides of trimethylamine, triethylamine, tripropylamine, monomethyldiethylamine, dimethylmonoethylamine, monomethyldipropylamine, N-dimethyl-, N-diethyl- or N-dipropylcyclohexylamine, N-dimethylmethylcyclohexylamine and pyridine can be used. U.S. Pat. No. 3,447,939 to Johnson, which is incorporated herein in its entirety by reference, discloses a process for dissolving cellulose in an anhydrous tertiary amine N-oxide, which is incorporated herein in its entirety by reference. A cyclic mono (N-methylamine-N-oxide) compound, such as NMMO is used as the solvent.

Any of the above described methods for producing cellulose fibrids can be used in the present invention. In addition, any other suitable method known in the art can be used to produce the cellulose fibrids.

Any of the above mentioned cellulose nanofibrils of the present invention can have an average length of less than about 800 micrometers. In another aspect, the cellulose nanofibrils have an average length in a range between about 300 micrometers to about 700 micrometers. Yet, in another aspect, the cellulose nanofibrils have an average length in a range between about 100 micrometers to about 500 micrometers. Still yet, in another aspect, the cellulose nanofibrils have an average length of less than about 200 micrometers. In one aspect, the cellulose nanofibrils have an average length about or in any range between about 100, 150, 200, 250, 300, 350, 400, 450, 500, 550, 600, 650, 700, 750, and 800 micrometers.

Any of the cellulose nanofibrils can be present in the fibers or films in a range between about 1 wt. % to about 80 wt. % based on the total weight of the fiber or film. In another aspect, the cellulose nanofibrils can be present in the fibers or films in a range between about 5 wt. % to about 70 wt. % based on the total weight of the fiber or film. Yet, in another aspect, the cellulose nanofibrils can be present in a range between about 20 wt. % to about 50 wt. % based on the total weight of the fiber or film. Still, in another aspect, the cellulose nanofibrils can be present in an amount about or in a range between about 1, 5, 10, 15, 20, 25, 30, 35, 40, 45, 50, 55, 60, 65, 70, 75, and 80 wt. % based on the total weight of the fiber or film.

Additives

The articles described herein, which can be fibers or films can include any suitable processing aids or additives, which can aid in forming a spinnable or extrudable spin mass. The processing aid can be present in a range between about 0.5 wt. % to about 10 wt. %. In another aspect, the processing aid can be present in the spin mass in a range between about 0.3 wt. % to about 5 wt. %. In yet another aspect, the processing aid can be present in the cellulose spin mass in a range between about 0.5 wt. % to about 2 wt. %. Still, in another aspect, the processing aids are present in an amount about or in any range between about 0.1, 0.2, 0.5, 0.7, 1.0, 1.5, 2.0, 2.5, 3.0, 3.5, 4.0, 4.5, and 5.0 wt. %. Non-limiting examples of suitable processing aids include carboxymethylcellulose, starch, glyoxal, glutaraldehyde, boric acid carbonate, zirconium ammonium carbonate, glyoxalated polyacrylamide, polyamide-epichlorohydrin, polyamine-epichlorohydrin, urea-formaldehyde, melamine-formaldehyde, polyethyleneimine, propylene glycol, diethylene glycol, triethylene glycol, dipropylene glycol, glycerol, triacetin (glycerol triacetate), diethylene glycol diacetate, triethylene glycol diacetate, tripropionin, acetyl triethyl citrate, triethyl citrate, or any combination thereof.

Optionally, an acid can be added to the PVOH and organic filler combination to generate $CO_2$, which results in expanded fibers and can lead to bulkier paper webs. Alternatively, sodium bicarbonate can be added to generate even more $CO_2$. Optional acids include sulfuric acid, hydrochloric acid, nitric acid, phosphoric acid, or any combination thereof.

Method of Making

In accordance with the present invention, a method of making the articles described herein, which can be fibers or films, includes mixing a PVOH with an inorganic filler with particles having an average diameter of less than about 20 micrometers and preparing an extrudable spin mass. In one aspect, the PVOH has a degree of hydrolysis of greater than about 95% and is present in a range between about 20 wt. % and about 99 wt. % based on the total fiber weight.

Initially, the PVOH is mixed with inorganic filler, and optionally, processing aids and cellulose particles, to form an extrudable spin mass. When cellulose nanofibrils, cellulose nanocrystals, or cellulose fibrids are included, additives such as carboxymethyl cellulose can be added to increase the extensibility of the spin mass. The properties of the PVOH are chosen to obtain the desired rheology.

The fibers can be formed from the spin mass using various methods, including, for example, wet spinning, dry spinning, shear spinning, or slit extruding. Films also can be formed by an extrusion process. In a solution spinning process, the extrudable spin mass is delivered to orifices of a spinneret. As one of ordinary skill in the art will understand, a spinneret refers to a portion of a fiber forming apparatus that delivers molten, liquid, or dissolved materials through orifices for extrusion into an outside environment. A spinneret includes from about 1 to about 500,000 orifices per meter of length of the spinneret. A spinneret can be implemented with holes drilled or etched through a plate, or with any other structure capable of issuing desired fibers.

Upon emerging from the spinneret, the PVOH and inorganic filler combination solidifies to form the fibers or films. In a wet solution spinning process, the spinneret can be submerged in a coagulation or spinning bath (e.g., a chemical bath), such that upon exiting the spinneret, one or more materials can precipitate and form solid fibers. The composition of the spinning bath can vary depending upon the desired application of the resulting fibers. For example, the spinning bath can be water, an acidic solution (e.g., a weak acid solution including sulfuric acid), or a salt bath using sodium sulfate for example. In a dry solution spinning process, one or more materials can emerge from the spinneret in warm air and solidify due to a solvent (e.g., acetone) evaporating in the warm air.

After emerging from the spinneret, fibers can be drawn or stretched utilizing a godet or an aspirator. For example, fibers emerging from the spinneret can form a vertically oriented curtain of downwardly moving fibers that are drawn between variable speed godet rolls before being wound on a bobbin or cut into staple fiber. Fibers emerging from the spinneret can also form a horizontally oriented curtain within a spinning bath and can be drawn between variable speed godet rolls. As another example, fibers emerging from the spinneret can be at least partially quenched before entering a long, slot-shaped air aspirator positioned below the spinneret. The aspirator can introduce a rapid, downwardly moving air stream produced by compressed air from one or more air aspirating jets. The air stream can create a drawing force on the fibers, causing them to be drawn between the spinneret and the air jet and attenuating the fibers. During this portion of fiber formation, one or more polymer materials forming the fibers can be solidifying.

Following extrusion from the spinnerets, the shaped fibers or films can be dried by any suitable method. For example, the fibers or films can be air-dried. Alternatively, the fibers or films can be dried in a hot air stream. These fibers can be incorporated into a paper web.

Fibers can be formed with or without additional fillers to produce unique cellulose shapes beneficial to paper properties. U.S. 2006/0012072 to Hagewood et al. discloses methods for forming various shaped fibers, which is incorporated herein in its entirety by reference.

In one aspect of the present invention, a method of making a paper comprises initially forming a mixture (or composite) of PVOH and an inorganic filler. Then, the method includes incorporating the mixture into a tissue furnish (or adding the composite to the tissue furnish), forming a nascent web, and then drying the nascent web to form the paper, handsheet, or tissue. Alternatively, the method of making the paper includes forming the nascent web, dewatering the nascent web, substantially disposing the mixture onto the surface of the nascent web, and then drying the nascent web to form the paper. The nascent web can be dried by air-drying, through-air drying (TAD), drum drying (e.g., drying on the surface of a Yankee dryer), or any combination thereof.

Optionally, the PVOH fibers are cut into short staple fibers prior to being added to the tissue furnish. One potential advantage of employing staple fibers is that a more isotropic web can be formed, since the staple fibers can be oriented in the web more randomly than longer fibers.

In another aspect, a tissue furnish of cellulose fibers can be deposited onto a forming surface to form a nascent web. Then, the mixture of PVOH and inorganic filler can be substantially disposed onto the surface of the nascent web by spraying or any suitable application method. Alternatively, the mixture can be substantially disposed onto the surface of the paper after an initial drying process. For example, the mixture can be substantially disposed, i.e., by spraying, onto the surface of the paper after drying on a Yankee dryer, but prior to drying by a second drying method.

In another aspect, an inorganic filler and PVOH are combined to form a mixture, and then the mixture is dried and ground to an average particle size in a range between about 1 micrometer to about 80 micrometers. Yet, another aspect, the mixture is dried and ground to an average particle size in a range between about 5 micrometers to about 50 micrometers. Still yet, in another aspect, the mixture is dried and ground to an average particle size in a range between about 10 micrometers to about 25 micrometers. In one aspect, the mixture is dried and ground to an average particle size in a range between about 1, 5, 10, 15, 20, 25, 30, 35, 40, 45, 50, 55, 60, 65, 70, 75, and 80 micrometers. Then, the mixture can be added to a tissue furnish. Retention aids can be added to the tissue furnish if necessary. Alternatively, the mixture is spray-dried with a particle size that can be retained in a tissue furnish. A method of spray-drying is described in U.S. Pat. No. 8,372,320 to Gardner et al., which is incorporated herein in its entirety by reference.

With respect to the above description, it is to be realized that the optimum proportional relationships for the parts of the invention, to include variations in components, concentration, shape, form, function, and manner of manufacture, and use, are deemed readily apparent and obvious to one skilled in the art, and all equivalent relationships to those illustrated in the specification are intended to be encompassed by the present invention.

The foregoing is considered as illustrative only of the principles of the invention. Further, various modifications may be made of the invention without departing from the scope thereof, and it is desired, therefore, that only such limitations shall be placed thereon as are imposed by the prior art and which are set forth in the appended claims.

What is claimed is:

1. A fiber comprising:
a polyvinyl alcohol, the polyvinyl alcohol having a degree of hydrolysis of greater than 95%, and being present in a range between about 20 wt. % and about 99 wt. % based on total fiber weight; and
an inorganic filler comprising particles having an average diameter of less than about 20 micrometers and present in a range between about 20 wt. % and about 50 wt. % based on total fiber weight;
wherein the polyvinyl alcohol in the fiber is partially soluble in water at a temperature less than 95° C., and the fiber substantially remains in a shaped state when immersed in water or an aqueous environment.

2. A film comprising:
a polyvinyl alcohol, the polyvinyl alcohol having a degree of hydrolysis of greater than 95%, and being present in a range between about 20 wt. % and about 99 wt. % based on total film weight;
an inorganic filler comprising particles having an average diameter of less than about 20 micrometers and present in a range between about 20 wt. % and about 50 wt. % based on total film weight; and
cellulose particles in a range between about 1 wt. % and about 50 wt. % based on total film weight;
wherein the polyvinyl alcohol in the film is partially soluble in water at a temperature less than 95° C., the film substantially remains in a shaped state when immersed in water or an aqueous environment, and the film is a thin, flexible strip.

3. The fiber of claim 1, wherein the inorganic filler particles have an average diameter of less than about 3 micrometers.

4. The fiber of claim 1, wherein the filler is precipitated calcium carbonate, ground calcium carbonate, gypsum, titanium dioxide, clay, silica, or any combination thereof.

5. The fiber of claim 1, wherein the polyvinyl alcohol is present in a range between about 40 wt. % and about 60 wt. % based on the total fiber weight.

6. The fiber of claim 1, wherein the polyvinyl alcohol has a degree of polymerization in a range between about 500 and about 3,000.

7. The fiber of claim 6, wherein the degree of polymerization is in a range between about 1,000 and about 1,600.

8. The fiber of claim 1, wherein the degree of hydrolysis is greater than about 98%.

9. The fiber of claim 1, further comprising cellulose particles in a range between about 1 wt. % and about 50 wt. % based on the total weight of the article.

10. The fiber of claim 9, wherein the cellulose particles are cellulose nanofibrils or cellulose fines.

11. The fiber of claim 9, wherein the cellulose particles are hardwood kraft pulp particles, softwood kraft pulp particles, hardwood sulfite pulp particles, softwood sulfite pulp particles, grass pulp particles, or any combination thereof.

12. The fiber of claim 1, further comprising a processing aid.

13. The fiber of claim 12, wherein the processing aid is present in a range between about 0.5 wt. % and about 10 wt. % based on the total article weight.

14. The fiber of claim 13, wherein the processing aid is carboxymethylcellulose, starch, glyoxal, glutaraldehyde, dialdehydes boric acid carbonate, zirconium ammonium carbonate, glyoxalated polyacrylamide, polyamide-epichlorohydrin, polyamine-epichlorohydrin, urea-formaldehyde, melamine-formaldehyde, polyethyleneimine, propylene glycol, diethylene glycol, triethylene glycol, dipropylene glycol, glycerol, or any combination thereof.

15. The fiber of claim 1, wherein the polyvinyl alcohol is partially soluble in water at a temperature in a range between about 75° C. and about 95° C.

16. The fiber of claim 1, further comprising a $CO_2$-generating acid.

17. The fiber of claim 1, further comprising $CO_2$-generating sodium bicarbonate.

18. A method of making a fiber, the method comprising:
mixing a polyvinyl alcohol with an inorganic filler, the inorganic filler comprising particles having an average diameter of less than about 20 micrometers and being present in a range between about 20 wt. % and about 50 wt. % based on total fiber weight, and the polyvinyl alcohol having a degree of hydrolysis of greater than 95% and being present in a range between about 20 wt. % and about 99 wt. % based on the total fiber weight; and
preparing an extrudable spin mass; and
using the extrudable spin mass to form the fiber;
wherein the polyvinyl alcohol in the fiber is partially soluble in water at a temperature less than 95° C., and the fiber substantially remains in a shaped state when immersed in water or an aqueous environment.

19. The method of claim 18, wherein using the extrudable spin mass comprises wet spinning, dry spinning, shear spinning, or slit extruding the extrudable spin mass to form the fiber.

20. The method of claim 18, further comprising mixing the polyvinyl alcohol, the filler, or both with cellulose particles.

21. The method of claim 20, wherein the cellulose particles are cellulose nanofibrils or cellulose fines.

22. The method of claim 20, wherein the cellulose particles are derived from hardwood kraft pulp, softwood kraft pulp, hardwood sulfite pulp, softwood sulfite pulp, grass pulp, or any combination thereof.

23. The method of claim 20, further comprising extracting the cellulose particles from waste paper, seed pods, algae, bacteria, tunicates, or any combination thereof.

24. The method of claim 18, wherein the polyvinyl alcohol has a degree of polymerization in a range between about 500 and about 3,000.

25. The method of claim 24, wherein the degree of polymerization is in a range between about 1,000 and about 1,600.

26. The method of claim 18, wherein the degree of hydrolysis is greater than about 98%.

\* \* \* \* \*